United States Patent
Kaaden et al.

[11] Patent Number: 5,949,606
[45] Date of Patent: Sep. 7, 1999

[54] DETECTION CIRCUIT FOR PILOT TONES FOR TRACKING CONTROL IN THE CASE OF MAGNETIC-TAPE RECORDINGS

[75] Inventors: Juergen Kaaden, Villingen; Sabine Roth, Moenchweiler; Heinrich Schemmann, Villingen-Schwenningen, all of Germany

[73] Assignee: Deutsche Thomson-Brandt GmbH, Germany

[21] Appl. No.: 08/814,121

[22] Filed: Mar. 10, 1997

[30] Foreign Application Priority Data

Mar. 13, 1996 [DE] Germany ............... 196 09 736

[51] Int. Cl.[6] ................................. G11B 5/584
[52] U.S. Cl. ........................... 360/77.14; 360/51
[58] Field of Search ............... 360/77.14, 77.13, 360/77.15, 73.12, 73.14, 51; 331/1 R, 1 A, 10, 17, 25

[56] References Cited

U.S. PATENT DOCUMENTS

| | | | |
|---|---|---|---|
| 5,258,879 | 11/1993 | Shimotashiro et al. | 360/77.14 |
| 5,369,376 | 11/1994 | Leblebicioglu | 331/25 X |
| 5,404,250 | 4/1995 | Hase et al. | 331/25 X |
| 5,594,602 | 1/1997 | Isaka et al. | 360/77.14 |
| 5,754,356 | 5/1998 | Honjo et al. | 360/77.14 X |

FOREIGN PATENT DOCUMENTS

| | | |
|---|---|---|
| 0644531 | 3/1995 | European Pat. Off. . |
| 60-59559 | 4/1985 | Japan . |
| 7-87041 | 3/1995 | Japan . |

OTHER PUBLICATIONS

JP 4–258807 A Patents Abstracts of Japan, P–1476, Jan. 28, 1993 vol. 17, No. 45.

*Primary Examiner*—Aristotelis M. Psitos
*Assistant Examiner*—James L. Habermehl
*Attorney, Agent, or Firm*—Joseph S. Tripoli; Joseph J. Laks; Francis A. Davenport

[57] ABSTRACT

In the case of various recording systems based on the helical-scan method for magnetic tapes, a pilot-tone principle is used for tracking control, generally using two pilot tones which are recorded on the helical tracks respectively in series of four: pilot tone F1, no pilot tone, pilot tone F2, no pilot tone. Known methods for determining the pilot-tone amplitudes use narrow-banded band filters, a control signal being generated by forming the difference between the amplitudes. On account of the weak pilot tones, this requires very narrow-banded filters with good dynamic properties.

According to the invention, a quadrature mixing has the effect of converting the two pilot tones into the baseband, whereby the filtering is performed in the low-pass range and a control signal can be derived from the difference between the pilot-tone amplitudes thus determined.

8 Claims, 5 Drawing Sheets

DETECTION CIRCUIT FOR PILOT TONES FOR TRACKING CONTROL IN THE CASE OF MAGNETIC-TAPE RECORDINGS

The present invention relates to a detection circuit for pilot tones which are used for tracking control in the case of magnetic-tape recordings, in particular for tracking control in the case of helical-scan magnetic-tape recordings using pilot tones recorded on the tape.

For controlling the position of a read/write head in a recording system with magnetic tapes, for example in the case of future digital video recorders, which are at present still at the definition phase or trial phase, specific unmodulated tones are superimposed on the wanted signal on the helical tracks of the tape during recording, without the wanted signal being disturbed. This is known, for example, from "Borgers et al: An Experimental Digital VCR with 40 mm Drum, single Actuator and DCT-based Bit-Rate Reduction, IEEE Transactions on Consumer Electronics, Vol. 34, No. 3, August 1988, page 597 et seq.", where two pilot tones of different frequencies F1 and F2 are recorded on the tracks or helical tracks. Such a method is sketched by way of example in FIG. 5, the tracks 1 and 3 containing only wanted signals, but no spectral components of the pilot-tone frequencies F1 or F2, while in addition track 0 contains a pilot tone of frequency F1, track 2 contains a tone of frequency F2 and track 4 in turn contains a pilot tone of frequency F1. This track sequence is repeated in series of four. During playback, these pilot signals can be detected and then make possible a statement on the current head position in relation to the recorded magnetization pattern, since the magnetic head has, on account of its dimensions and field distribution, the characteristic that components of the left and right neighbouring tracks of the track in question also occur in the playback signal. Thus, during playback of track 1, components of tracks 0 and 2, and consequently in particular their pilot tones, are also encountered in the signal. By filtering out the components of frequencies F1 and F2, determining the amplitudes of the pilot-tone signals and subsequently forming the difference between the amplitudes, a controlled variable is defined, which contains information on whether the head is closer to track 0 or to track 2. Accordingly, such a differential signal can be used for controlling the position of the read/write head. Such an exact positioning of the head is necessary in particular in the case of digital video recorders, since exact positioning is necessary on account of the high volume of digital information, i.e. the high recording density, for reading and recording the data. Since the pilot signals are present only in every second track, in the example according to FIG. 5 this method can of course be used only in tracks 1, 3, 5 . . . . On account of the inertia of the mechanical head system, however, the periodic presence of the pilot-tone information is adequate for controlling the head positioning.

The abovementioned document discloses a method in which the two pilot tones are separated by means of respective bandpass filtering and subsequent rectification. In order to separate the weak pilot tones from the strong wanted signal, the filters used must be very narrow-banded (Q factor 80 . . . 100) and have good dynamic properties with regard to noise and linearity. Known actual filters use trimmed discrete elements (LC). A disadvantage in this case is that, owing to the narrow-bandedness and the Q factor, these LC filters are expensive and also have to be trimmed individually. A further disadvantage is that the pilot-tone frequency fluctuates if there is a variation in tape speed, so that, given the predetermined narrow-bandedness of the bandpass filters, an evaluation of the pilot-tone amplitudes for controlling the head position is possible only at a specific playback speed of the tape. During slow-motion operation or other special-effect modes, the control would, for example, either not function or give an erroneous evaluation of the amplitudes, which would be fed to the automatic control system, whereby in effect no data reproduction would be achieved.

The invention is therefore based on the object of providing a circuit and a method for tracking control with pilot tones in the case of recording systems for a magnetic tape based on the helical scanning method which make possible a simple and reliable determination of the amplitudes of the pilot tones.

The object is achieved by the subject-matter of claims 1 and 26. Advantageous refinements of the invention are the subject-matter of the subclaims.

According to the invention, the amplitudes of the pilot tones present in the playback signal are determined by means of a so-called quadrature mixing. In other words, the pilot-tone signal is converted into the "baseband", so that the necessary filtering for determining the amplitudes can be carried cut by a filtering in the low-pass range. In this case, a signal generator for the respective pilot-tone frequency F1 or F2 in each case supplies two pilot-tone carriers, which are phase-shifted with respect to each other by 90° if two pilot tones are used. The playback signal V is mixed with these pilot-tone carriers in corresponding multipliers. The products obtained are low-pass-filtered, squared and summated, so that the signal obtained with regard to the respective pilot tone corresponds to the square of the pilot-tone amplitude. If two pilot tones are used, the difference between the two pilot-tone amplitudes thus determined contains information on the track position of the head, which can be fed to an automatic control system for controlling the position of the read/write head.

The circuit according to the invention or the method according to the invention can be fully integrated (in analogue or digital form), requires no trimming and is inexpensive. A further advantage of the approach according to the invention is that the pilot carriers generated for demodulation can be coupled to the regenerated channel clock of the data information, as a result of which different speeds of the video recorder then no longer have any influence on the controlling of the position of the head. If there is any wow and flutter of the tape speed, the frequency selection then follows the signal. This may be important in particular in the case of fast forwarding, slow-motion mode or other special-effect modes.

Optionally, the playback signal read from the tape may be filtered with a low-pass filter before feeding the playback signal to the quadrature mixing, so that spectral components way above the frequencies F1 and F2 are eliminated. This advantageously reduces the requirements imposed on the dynamics, i.e. on the processing speed, of the following blocks of the circuit or of the method. Furthermore, the upstream low-pass filter is necessary if the local pilot-tone signals fed to the mixer are not exactly sinusoidal. Then, the spectral components in the harmonics of the pilot tones must be suppressed before the mixers. Since the upstream low-pass filter is shared by both signal paths of the pilot tones, this is also advantageous for matching if the circuit is of an analogue form. If the circuit is of a digital form, the upstream low-pass filter effects a decimation of the playback signal, i.e. reduction of the bandwidth, making it possible to perform the calculation of the subsequent operations on the basis of the sampling theorem at a slower speed.

For demodulation of the two pilot tones, two pilot-tone generators are necessary, it advantageously being possible for the pilot tones to be generated by a division of the regenerated system clock (=data clock of the playback signal). This system clock is required for the A/D conversion and the digital parts of the channel demodulator.

For example, in the case of a DVC cassette (DVC= Digital Video Cassette), the pilot tones have the frequencies $$F1=FS/60=697 \text{ kHz}$$

$$F2=FS/90=464.4 \text{ kHz}$$

FS being the system-clock frequency (about 41.8 MHz).

Advantageously, the approach according to the invention may be used both for an analogue form of circuit and a digital form of circuit, if the playback signal is available in digitized form with adequate resolution. In this case, the low-pass filters required are realized by means of digital filters.

In the case of the digitized version, it is advantageously possible to split the upstream input low-pass filters into a series of subfilters. Since the read signal from the A/D converter arrives at a high sampling rate, it is necessary for the first subfilter to operate at this high data rate. However, the first subfiltering has the effect of decimating the data rate for the first time, so that processing by time-division-multiplexed hardware is possible for the subsequent subfilter, since the signal now has a lower bandwidth on account of the first low-pass filter. The further decimation of the subsequent low-pass subfilters may then have the effect of making the data rate of the signals containing the pilot tones so low that the multipliers (demodulators) can be realized by a single parallel/serial structure. Furthermore, the splitting of the input low-pass filter into a series of low-pass filters offers the advantage that the filter following the first filter can be adapted to the frequency of the pilot tone concerned.

The following relations apply for the pilot-tone carrier signals applied to the multipliers:

$$A0(t)=C \cos(2pi[Fs/60]t) \quad (1)$$

$$A1(t)=C \sin(2pi[Fs/60]t) \quad (1)$$

$$B0(t)=C \cos(2pi[Fs/90]t) \quad (2)$$

$$B1(t)=C \sin(2pi[Fs/90]t) \quad (2),$$

Fs being the data clock of the playback signal. Cases (1) correspond to the pilot tone F1, while cases (2) correspond to the pilot tone F2. To be on the safe side, in the digital case sampling takes place at a higher frequency than the minimum necessary frequency according to the sampling theorem, for example:

$$Fs1=Fs/20$$

and $$Fs2=Fs/30.$$

Consequently, the following are obtained for the sequences of sampled values:

$$A0(k)=B0(k)=C \cos(2pi \, k/3) \, K=0, 1, 2$$

$$A1(k)=B1(k)=C \sin(2pi \, k/3) \, K=0, 1, 2.$$

Accordingly, only 2 to 3 different numerical values have to be generated for generating the carriers.

Following the multiplication or demodulation, the sampling rate of the signal has been decimated to such an extent that subsequent processing steps can readily be taken over by a digital signal processor. This would be advantageous in a system which already contains a digital signal processor, for example a digital servo processor.

The pilot-tone carriers for demodulation which are present at the local inputs of the multipliers are preferably generated by frequency division from a local clock signal T, it being possible for the local clock signal to be generated in its frequency on the one hand by a locally provided quartz crystal or to be synchronized to the data signal coming with the system clock from the storage medium.

Preferably, shortly after the beginning of playback, the quartz-crystal reference is used, while after synchronization of the clock to the incoming data signal or playback signal, the clock of the latter is used.

Advantageously, the low-pass filters of the pilot-tone branches may be arranged on an integrated circuit, while the input low-pass filter is external. It is also possible to arrange all the low-pass filters on an integrated circuit.

Furthermore, the circuit may have a frequency-controlled clock oscillator and a phase detector, which are part of a phase-locked loop which synchronizes the clock oscillator to the system clock of the playback signal. In this case, the clock oscillator may be tunable in its free-running frequency by means of a digital control bus. For tuning the free-running frequency of the clock oscillator, use may be made of a reference clock from a quartz oscillator of known frequency, which is then applied to an input of the phase detector. The control voltage of the frequency-controlled clock oscillator is then available in this case at an external pin of the circuit. Advantageously, the phase-locked loop multiplies the frequency of the input signal present at the one input of the phase detector, the clock being fed back via a divider. The clock frequency is advantageously chosen such that there is a factor of 4 in the divider factors for generating the two pilot-tone frequencies. In this case, the divider factor of 4 is connected as the last stage, so that the signal generator can supply for each of the two pilot tones pilot-tone carriers with a 0° and 90° phase position. in the digital case, the low-pass filters of the pilot-tone branches may be designed as MTA filters (Moving Time Average).

Advantageously, the arrangement for generating the clock has three operating modes:
 i) PLL operation with use of the quartz oscillator and feedback of the clock (T) via the divider D for finding the track and for tuning the oscillator;
 ii) PLL operation with use of the data clock of the playback signal and feedback via the divider D in playback operation, in particular in special-effect modes;
 iii) Comparison of the frequencies of the quartz oscillator and of the data clock with the aid of the frequency detector FD for measuring the tape speed.

The circuit may be realized partly with the aid of parallel arithmetic and logic and partly as a program on a digital signal processor.

The invention is described below with reference to the drawings, in which.

Figure 1:
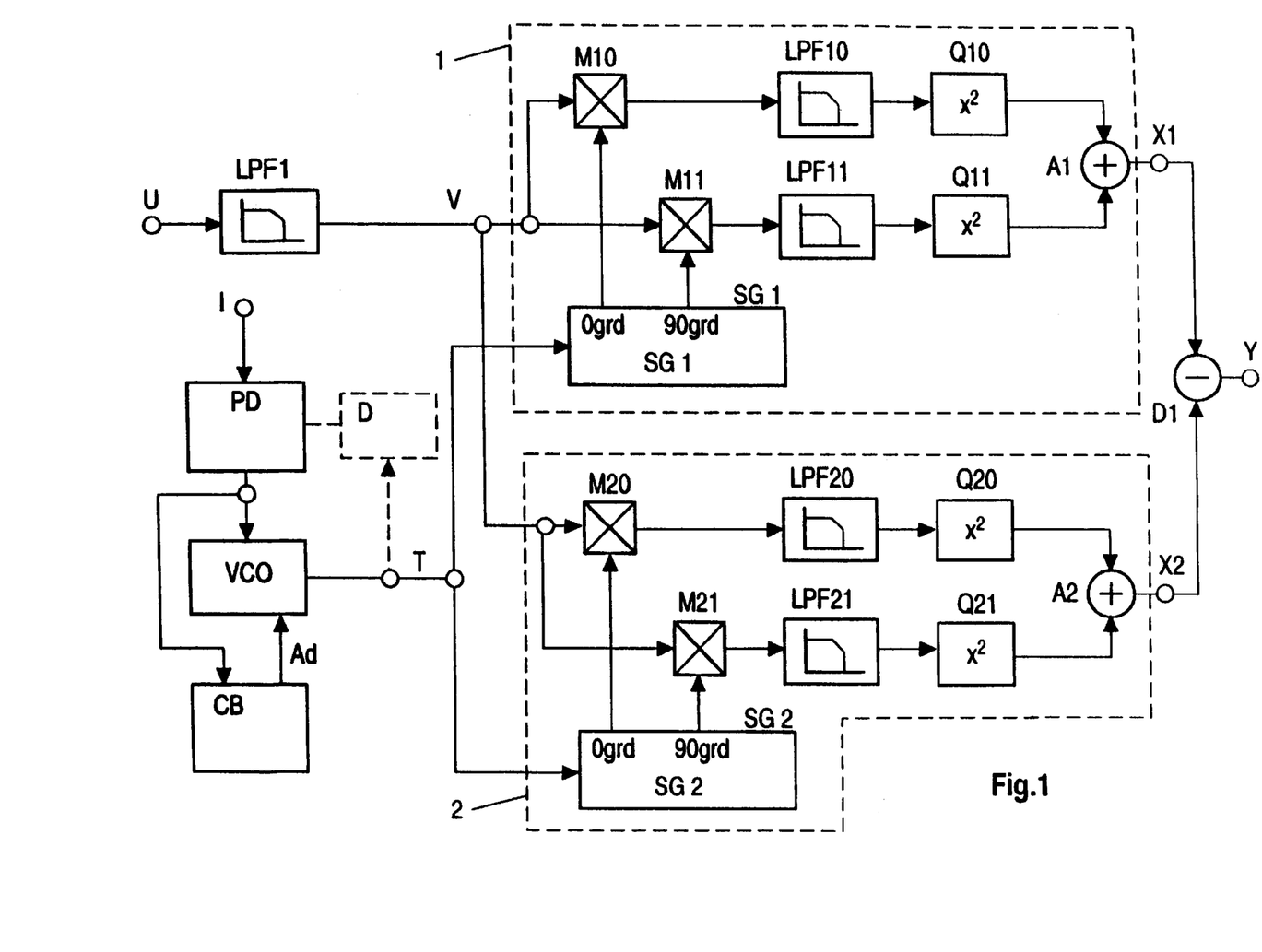
FIG. 1 shows the detection circuit in the analogue case.
Figure 5:
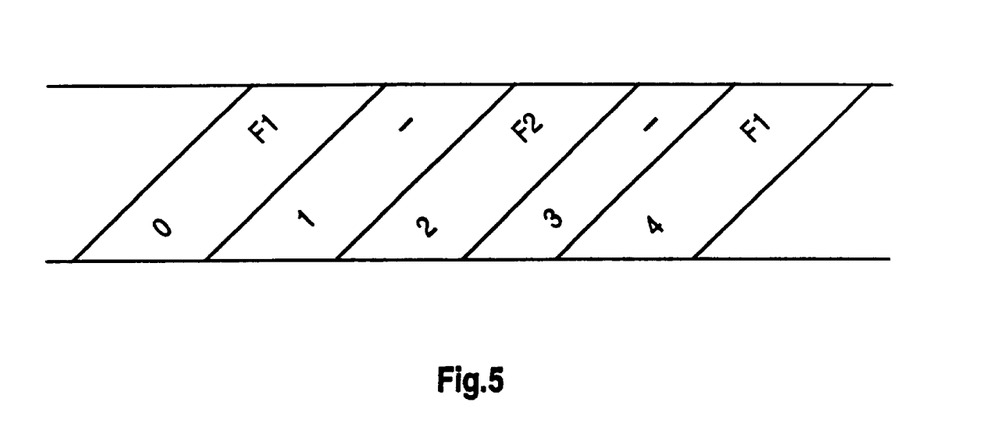
FIG. 5 shows a representation of the helical-scan recording method using two pilot tones.

FIG. 1 shows a preferred embodiment of the detection circuit for determining a control signal Y for the positioning of the read/write head of a magnetic-tape recording apparatus from the amplitudes of the two pilot tones used, which are recorded as described in FIG. 5. In this case, for example, track 0 contains in addition to the wanted signal the pilot tone F1, track 1 contains only the wanted signal, track 2 contains in addition to the wanted signal the pilot tone F2, track 3 contains only the wanted signal, and track 4 contains in addition to the wanted signal the pilot tone F1, etc. An embodiment in the analogue case is represented. The signal U (playback signal) read from the tape is low-pass-filtered in a first common low-pass input filter LPF1, in order to eliminate strong spectral components way above the pilot tone frequencies F1 or F2, respectively. The resulting low-pass-filtered playback signal V is fed to a first quadrature mixing branch 1 with respect to the frequency F1 and to a second quadrature mixing branch 2 with respect to the pilot-tone frequency F2. The first quadrature mixing branch 1 is explained below, since the second quadrature mixing branch differs from the first only with regard to the pilot-tone frequency. A signal generator SG1 supplies two carriers of the pilot-tone frequency F1, which are phase-shifted with respect to each other by 90°, as indicated in FIG. 1. Graphically, this means in one case a sine-wave oscillation and in the other case a cosine-wave oscillation. The quadrature mixing branch 1 comprises two subbranches, which are respectively formed by the mixer M10, the low-pass filter LPF10 and the squarer Q10, and by the mixer M11, the low-pass filter LPF11 and the squarer Q11. The low-pass-filtered playback signal V is mixed in the multipliers M10 and M11 with carriers generated by the signal generator SG1. The products obtained in the mixers are low-pass-filtered in the respective low-pass filters LPF10 and LPF11 and subsequently squared in the corresponding squarers Q10 and Q11. By appropriate choice of the low-pass filters LPF10 and LPF11, higher harmonics are suppressed, so that in the squarers there is formed in each case the $\cos^2$ or the $\sin^2$ with the corresponding ¼ value of the pilot-tone amplitude. By the addition at point A1 of the two values, there is accordingly obtained as the output signal X1 the amplitude square of the pilot tone F1 multiplied by a constant factor of ¼, which is insignificant. The same operation is carried out in the quadrature branch 2, with the only difference that the signal generator SG2 generates two pilot-tone carriers of the frequency F2 phase-shifted with respect to each other by 90°. In this case, the quadrature branch 2 comprises the multipliers M20 and M21, the low-pass filters LPF20 and LPF21 and also the squarers Q20 and Q21, the results of the two subbranches being added at point A2, so that there is provided as the output signal X2 the square of the pilot-tone amplitude with regard to the frequency F2, the amplitude square being multiplied by a factor of ¼, which represents a pure normalizing factor. The two output signals obtained, of the amplitude squares of the pilot tones F1 and F2, are subtracted from each other in a subtracter D1 and give the control signal Y. Advantageously, the amplitude squares are used for the control signal, since forming the absolute value of the variables X1 and X2 provides no advantages and, furthermore, increases computational complexity and reduces accuracy.

For generating the required frequencies of the signal generators SG1 and SG2, the latter are controlled by a clock frequency T, which is generated in a phase-locked loop (PLL), comprising a phase detector PD and a frequency-controlled clock oscillator VCO. The frequency-controlled clock oscillator can be tuned in its free-running frequency by means of a signal Ad and by means of a digital control bus CB. For tuning, a reference clock from a quartz oscillator of known frequency is applied to an input I of the phase detector PD. The PLL multiplies the frequency of the input signal present at the input I of the phase detector PD, for which purpose a divider D may be arranged in the feedback path of the clock signal T to the phase detector PD.

Figure 2:
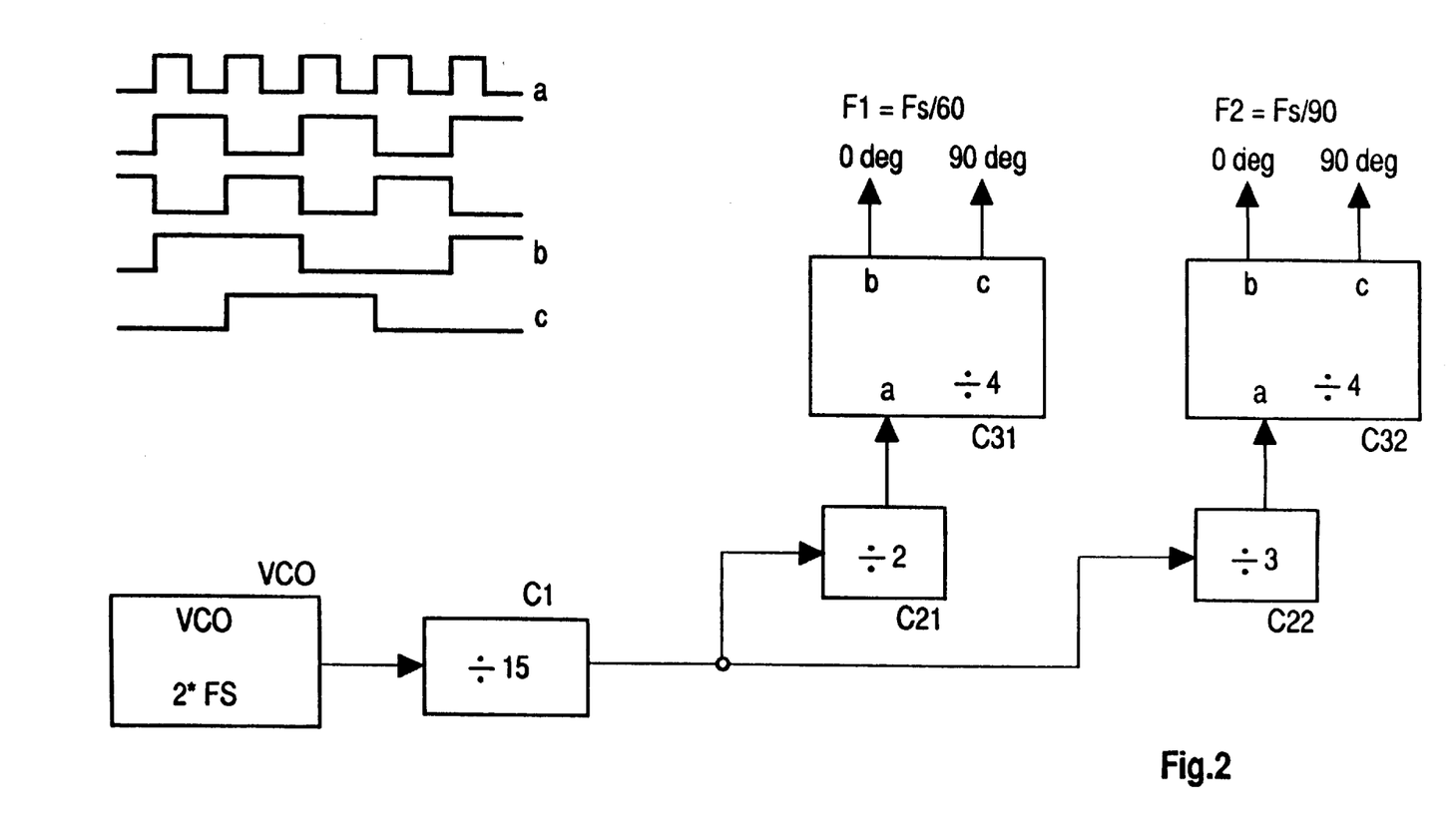
FIG. 2 shows the generation of the pilot-tone carriers to be mixed.

FIG. 2 shows a way of realizing the clock frequency for the signal generators SG1 and SG2. Twice the data clock rate is output from the frequency-controlled clock oscillator VCO and is divided in a first divider by a factor of 15. After parallel branching, the clock frequency reduced by the factor 15 is divided in a further divider C21 by the factor 2, or in a divider C22 by the factor 3. The frequencies obtained are respectively fed to a divider C31 or C32, in which the frequency is further reduced by a factor of 4. Accordingly obtained are, with regard to the signal generator SG1, the first pilot-tone frequency F1, which is ¹⁄₆₀ of the data clock rate of the playback signal, and, in the signal generator SG2, the pilot-tone frequency F2, which is ¹⁄₉₀ of the data clock rate.

Indicated at the top left of FIG. 2 are pulse diagrams, the upper row a representing the input clock at the divider C31 or C32, which is respectively reduced twice by a factor of 2 and yields the output signals B and C, which are phase-shifted with respect to each other by 90° at the output of the respective signal generator SG1 or SG2.

Figure 3:
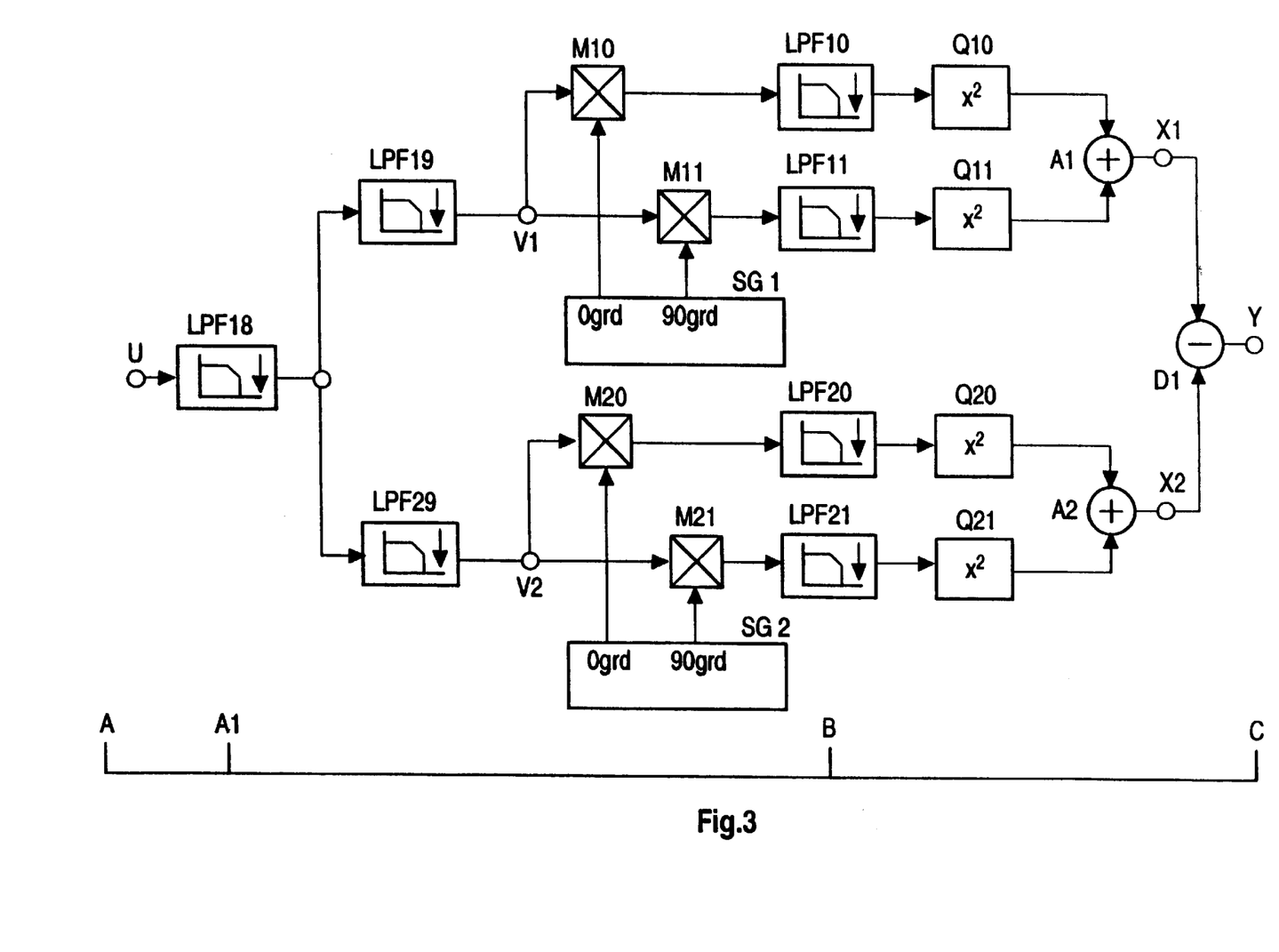
FIG. 3 shows a digital form of the pilot-tone detector.

FIG. 3 shows a digital form of the detector circuit according to FIG. 1. In order to decimate the bandwidths of the incoming digital playback signal U in a way corresponding to the pilot-tone frequencies F1 and F2 used, the low-pass input filter of FIG. 1 is then split into a common low-pass input filter LPF18 and subsequently in each case a low-pass filter LPF19 for the quadrature mixing branch of the frequency F1, and a low-pass filter LPF29 for the quadrature mixing branch of the pilot-tone frequency F2. This has the advantage that the sampling rate in the following processing stages is decimated, so that, as indicated below, at point A the digital playback signal still has the full sampling rate, while after the first low-pass filter LPF18, at point A1, this rate is already decimated. Consequently, processing with time-division-multiplexed hardware is possible in the following circuit parts from point A1 to point B. A further decimation takes place in the filter blocks LPF19 and LPF29, so that the rate of the signals V1 and V2 resulting there is so low that all the multipliers M10, M11, M20 and M21 can be realized by a single parallel/serial structure. Within the following low-pass filter blocks LPF10, LPF11, LPF20 and LPF21, the sampling rate of the four signals has then been decimated to such an extent that all the following processing steps can be taken over by a digital signal processor. This is advantageous in particular in a system which already contains a digital servo processor. The interface between the hardware and the digital signal processor is denoted in FIG. 3 by the point B.

Figure 4:
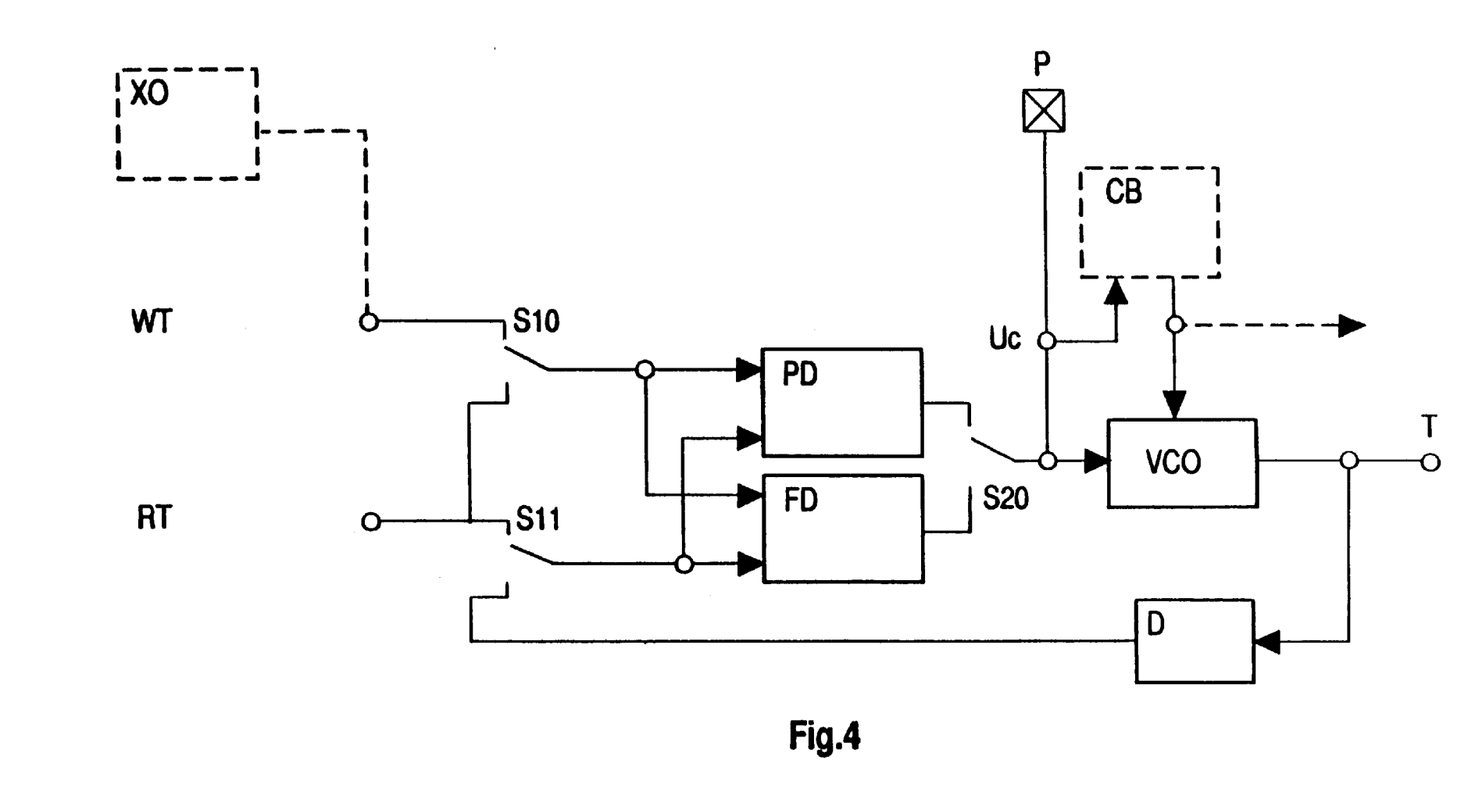
FIG. 4 shows the clock generation for generating the signal clock.

FIG. 4 shows a possible overall arrangement for generating the clock T for the detector system. The frequency-controlled oscillator VCO may be controlled by means of three operating modes, namely on the one hand a PLL operation with the use of an external quartz oscillator frequency and feedback of the clock via the divider D for finding the track and for tuning the oscillator VCO, on the other hand a PLL operation using the data clock of the playback signal and feedback of the clock via the divider D in playback mode, which is advantageous in particular in the case of special-effect modes, and a comparison of the, frequency of the quartz oscillator and of the data clock with the aid of the frequency detector FD for measuring the tape speed. The value obtained may be read via an external pin P or in digitized form via the control bus CB.

Advantageously, the circuit can be realized in a fully digital (amplitude- and time-discrete) form on an integrated CMOS circuit. In this case, the input signal U comes from an A/D converter for the playback signal. The filters LPF1, LPF11, LPF12, LPF20 and LPF21 are equipped with special filter structures, which are known as MTA filters or comb filters.

We claim:

1. A circuit for detection of a first and a second pilot tone used for tracking control in the case of a helical-scan magnetic-tape recording, wherein the tracking control is performed by quadrature mixing incoming playback signal which contains a data clock signal and first and second pilot tones, said incoming playback signal being mixed with a pair of first and a pair of second pilot-tone carriers into a baseband, squaring quadrature-mixing results, adding them and forming then the difference between respective adding results to get a control signal which is used for the tracking control, said detection circuit comprising:

means for low-pass filtering the incoming playback signal before quadrature mixing;

a first pilot-tone-processing branch comprising signal generating means for generating a pair of first pilot-tone carriers being phase-shifted to one another by 90°, two parallel subbranches, each comprising a series connection of a multiplier for quadrature mixing the low pass filtered incoming playback signal with one of the first pilot-tone carriers, a following low-pass filter and a squarer, and an adding means connected with each respective output of said subbranches;

a second pilot-tone-processing branch, parallel to the first pilot-tone-processing branch, comprising signal generating means for generating a pair of second pilot-tone carriers being phase-shifted to one another by 90°, two parallel subbranches, each comprising a series connection of a multiplier for quadrature mixing the low pass filtered incoming playback signal with one of the second pilot-tone carriers, a following low-pass filter and a squarer, and an adding means connected with each respective output of said subbranches;

subtracting means for forming the difference between the amplitudes of the outsignals of the respective signal-processing branches, each of said signal generating means having its frequency controlled by a clock signal; and selecting means for selecting between respective use a local quartz-crystal (XO) reference as a clock signal (T) shortly after beginning of playback, and data clock of the playback signal after synchronisation to the incoming playback signal.

2. A circuit for detection of a first and a second pilot tone according to claim 1, wherein said means for low-pass filtering the incoming playback signal comprises three low-pass filters, the first low-pass filter filtering the incoming playback signal, while the further low-pass filters being adapted to the frequencies of the respective pilot tones.

3. A circuit for detection of a first and a second pilot tone according to claim 1, wherein the means for low-pass filtering of the incoming playback signal comprises three low-pass filters, the first low-pass filter filtering the incoming playback signal, while the further low-pass filters being adapted to the frequencies of the respective pilot tones, and wherein the low-pass filters of the pilot-tone-processing branches are arranged on an integrated circuit, and the low-pass filter in front of them is external.

4. A circuit for detection of a first and a second pilot tone according to claim 1, wherein the means for low-pass filtering of the incoming playback signal comprises three low-pass filters, the first low-pass filter filtering the incoming playback signal, while the further low-pass filters being adapted to the frequencies of the respective pilot tones, and wherein all the low-pass filters are arranged on an integrated circuit.

5. A circuit for detection of a first and a second pilot tone according to claim 1, comprising a phase locked loop having a frequency-controlled clock oscillator (VCO) and a phase detector (PD), the frequency-controlled clock oscillator (VCO) being tunable in its free-running frequency via a digital control bus (CB) by control with a control-voltage being available at an external pin (P) of the circuit, the frequency-controlled oscillator (VCO)being controlled by means of different operating modes, namely on the one hand a PLL operation with the use of a reference clock being derived from a quartz oscillator (XO) which is applied to one input of the phase detector and the feedback of the clock via a divider (D) to the other input of the phase detector for finding a track and tuning the oscillator (VCO), and, on the other hand, a PLL operation using the data clock of the playback signal.

6. A circuit for detection of a first and a second pilot tone according to claim 1, comprising a phase locked loop having a frequency-controlled clock oscillator (VCO) and a phase detector (PD), the frequency-controlled clock oscillator (VCO) being tunable in its free-running frequency via a digital control bus (CB) by control with a control-voltage being available at an external pin (P) of the circuit, the frequency-controlled oscillator (VCO) being controlled by means of different operating modes, namely a PLL operation with the use of a reference clock being derived from a quartz oscillator (XO) which is applied to one input of the phase detector and the feedback of the clock via a divider (D) to the other input of the phase detector for track-finding and for tuning the oscillator (VCO), and a PLL operation using the data clock of the playback signal, and, furthermore, an operation for comparison of the frequency of the quartz oscillator and of the data clock with the aid of a frequency detector (FD) for measuring tape speed whereby the value obtained is read via the external pin (P) via the control bus (CB).

7. A circuit for detection of a first and a second pilot tone according to claim 1, comprising a phase locked loop having a frequency-controlled clock oscillator (VCO) and a phase detector (PD), the frequency-controlled clock oscillator (VCO) being tunable in its free-running frequency via a digital control bus (CB) by control with a control-voltage being available at an external pin (P) of the circuit, the frequency-controlled oscillator (VCO) being controlled by means of different operating modes, namely on the one hand a PLL operation with the use of a reference clock being derived from a quartz oscillator (XO) which is applied to one input of the phase detector and the feedback of the clock via a divider (D) to the other input of the phase detector for finding a track and for tuning the oscillator (VCO), and, on the other hand, a PLL operation using the data clock of the playback signal, and the clock frequency is chosen such that there is a factor of 4 in the divider factors for generating the two pilot-tone frequencies.

8. A circuit for detection of a first and a second pilot tone according to claim 1, comprising a phase locked loop having a frequency-controlled clock oscillator (VCO) and a phase detector (PD), the frequency-controlled clock oscillator (VCO) being tunable in its free-running frequency via a digital control bus (CB) by control with a control-voltage being available at an external pin (P) of the circuit, the frequency-controlled oscillator (VCO) being controlled by means of different operating modes, namely on the one hand a PLL operation with the use of a reference clock being derived from the quartz oscillator (XO) which is applied to one input of the phase detector and the feedback of the clock via a divider (D) to the other input of the phase detector for finding a track and for tuning the oscillator (VCO), and, on the other hand, a PLL operation using the data clock of the playback signal, the clock frequency being chosen such that there is a factor of 4 in the divider factors for generating the two pilot-tone frequencies, and the divider factor 4 is connected as the last stage and the 0° and 90° phase positions are supplied for each of the pilot tones.

* * * * *